United States Patent [19]

Fai

[11] Patent Number: 4,860,147
[45] Date of Patent: Aug. 22, 1989

[54] SHOCK-PROTECTED DOMESTIC ELECTRICAL APPARATUS

[75] Inventor: Kwok W. Fai, Chaiwan, Hong Kong
[73] Assignee: Simatelex Manufactory Company Limited, Hong Kong
[21] Appl. No.: 150,108
[22] Filed: Jan. 29, 1988

[30] Foreign Application Priority Data

Jan. 30, 1987 [GB] United Kingdom ............... 8702083

[51] Int. Cl.⁴ .................................... H02H 3/16
[52] U.S. Cl. ..................... 361/50; 361/42; 361/115; 219/363; 307/118; 200/325
[58] Field of Search ............ 361/42, 49, 50, 114, 361/115, 139, 157, 160; 219/363, 364; 307/118; 200/322, 324, 325, 43.16, 12, 323; 335/164, 165, 166, 170, 71, 72; 310/47

[56] References Cited

U.S. PATENT DOCUMENTS

| | | | |
|---|---|---|---|
| 1,051,929 | 2/1913 | Van Nuis et al. | 361/115 X |
| 1,836,985 | 12/1931 | Ow | 361/115 |
| 2,264,990 | 12/1941 | Lindstrom et al. | 361/115 X |
| 2,333,459 | 11/1943 | Atwood | 335/72 |
| 3,011,100 | 11/1961 | Spinelli et al. | 361/139 |
| 3,310,762 | 3/1967 | Goetz | 335/188 |
| 3,457,377 | 7/1969 | Olson | 200/325 X |
| 3,518,465 | 6/1970 | Jepson et al. | 310/47 |
| 4,194,104 | 3/1980 | Stenta | 200/153 J |
| 4,709,293 | 11/1987 | Gershen et al. | 361/50 |
| 4,751,603 | 6/1988 | Kwan | 361/42 |

Primary Examiner—A. D. Pellinen
Assistant Examiner—David Osborn
Attorney, Agent, or Firm—Pollock, Vande Sande & Priddy

[57] ABSTRACT

A safety device to protect a piece of domestic electrical apparatus connected by means of a flexible supply lead to a plug to be attached to a conventional mains outlet. Between the pins of the plug and the exposed electrical working components of the apparatus is provided an on-off switch which will isolate the electrical operating components from the mains supply when the switch is in the "off" position. Sensor means are positioned within the piece of domestic electrical apparatus adjacent any exposed electrical components and control means for detecting a path of conduction between the sensor means and those exposed electrical components. Magnetically controlled release means including a permanent magnet and an electrically induced magnetic field in opposition thereto, preferably a DC motor provides movement when energized by the control means when the latter detect a path of conduction. Mechanical latch means hold the switch in its "on" position until the means move, and resilient means then urge the switch to its "off" position when released by the mechanical latch means.

21 Claims, 2 Drawing Sheets 4,860,147

SHOCK-PROTECTED DOMESTIC ELECTRICAL APPARATUS

This invention relates to safety protection devices for domestic electrical apparatus.

BACKGROUND TO THE INVENTION

Various safety regulations require that domestic electrical apparatus and in particular apparatus of the portable kind be capable of being isolated from the mains supply automatically in the event of a fault. This is for example particularly true of items such as domestic hair driers which are liable to be used in a damp or wet environment. As a minimum, it is important that a switch device be provided to isolate the mains supply in the event that water enters the hair drier itself since this could cause a dangerous short to the exposed electrical components like the electric motor and the electric heating coils.

The invention has therefore been made with this in mind and it is an objective of the invention to provide a switching arrangement which automatically isolates the piece of apparatus like the hair drier in the event of a dangerous condition arising.

BRIEF SUMMARY OF THE INVENTION

According to the invention, there is provided a piece of domestic electrical apparatus connected by means of a flexible supply lead to a plug to be attached to a conventional mains outlet, and between the pins of the plug and the electrical working components of the apparatus is provided an on-off switch which will isolate the electrical operating components from the mains supply when the switch is in the "off" position, sensor means positioned within the piece of domestic electrical apparatus adjacent any exposed electrical components, control means for detecting a path of conduction between the sensor means and those exposed electrical components, magnetically controlled release means including a permanent magnet and an electrically induced magnetic field in opposition thereto to provide movement when energised by the control means when the latter detect a path of conduction, mechanical latch means capable of holding the switch in its "on" position until the release means move, and resilient means urging the switch to its "off" position when released by the mechanical latch means.

An advantage of the arrangement is that it is relatively simple and cheap to make. Also, the various components can be quite small and so included in the plug without making the plug significantly larger than a conventional plug.

An advantage of the invention, therefore, is that little change is required in the piece of hand-held apparatus, e.g. the hair drier. Thus, it is only necessary to include the sensor in it and since this sensor can for example be a piece of conductive material such as a metal foil, sheet, mesh or the like, it can be of insignificant weight and thickness. Therefore, it can be readily fitted into designs of existing hair drier housings and a three-core supply lead used to connect the apparatus to the plug, the third core being used for connecting the sensor to the plug which contains the control means.

The various components such as the switch and the control means can be relatively compact and light weight but inevitably if included in the body of the apparatus itself would be liable to require changes in the shape and size of the housing for this. Also they would add weight to be held and manipulated which with, for example, a hair drier is disadvantageous. This can be avoided according to the invention by including them in a plug which if necessary can be slightly larger than normal.

Preferably the switch means are a double-pole switch means which control both the live and the neutral lines from the mains supply so that it is not necessary for the plug to be a polarised plug which can only be inserted one way round in a socket. Suitable simple double-pole slide switches are widely available cheaply and these are suitable for use in the apparatus according to the invention.

According to one embodiment of the invention, the control means comprise an SCR device in series across the mains supply with the electrically induced magnetic field. The gate of the SCR device is connected to the sensor so that the SCR device is normally non-conductive but is rendered conductive when the path of conduction is established so that a high current then passes through the SCR and the electrically induced magnetic field is then created. In turn this induces movement and so releases the mechanical latch to allow the resilient means to switch off the mains supply. For greater safety, however, a pair of SCR devices may be provided in parallel. The arrangement will be such that one SCR device is rendered conductive when the said path of conduction is established with a part of the apparatus whose voltage is at or approaching the value of the live wire of the mains supply and the other SCR device will be rendered conductive when the said path of conduction is established with a part at or near the neutral of the mains supply.

Conveniently, the movement of the magnetically controlled release means when energised is rotary movement and an example of suitable means is an electric motor such as a simple DC motor having permanent magnet poles and an electrical coil on the armature. When that coil is energised because of conduction of the SCR device, then the armature will turn and attached to the armature is a mechanical trip which displaces the mechanical latch. In turn, once the mechanical latch is released, then the resilient means which can conveniently be in the form of a simple coil spring, push the switch to the "off" position so isolating the hand-held apparatus from the mains supply.

For simplicity, it is an advantage that the double-pole switch can be a simple mechanical double-pole slide switch and one does not need a relatively complicated and expensive piece of equipment like a relay to switch off the apparatus.

Also, it is a further advantage of the invention that whilst the piece of hand-held apparatus is operating correctly and in a safe condition, the control means and the permanent magnet means require virtually no electrical power for their operation. This is in contrast with more complicated switch means such as, for example, a relay, where a continuous current through the relay coil is often required to hold contacts in a closed position against a normal resilient urge to the "off" position.

In order to reduce the sensitivity of the mechanical latch means to unintended operation when subjected to vibration, e.g. dropping of the plug on the floor, the latch means may be resiliently urged to their normal holding position by means of a relatively light spring whose effect is overcome by the motion of the magnetically controlled release means. Alternatively, the output shaft of the motor and the latch means can be linked by, say, a crank on the shaft and a slot in the latch means so that the static torsion of the motor shaft resists unintended opening of the latch means.

DESCRIPTION OF THE DRAWINGS

The invention will now be described, by way of example, with reference to the accompanying drawings, in which.

DESCRIPTION OF THE PREFERRED EMBODIMENTS

Figure 1:
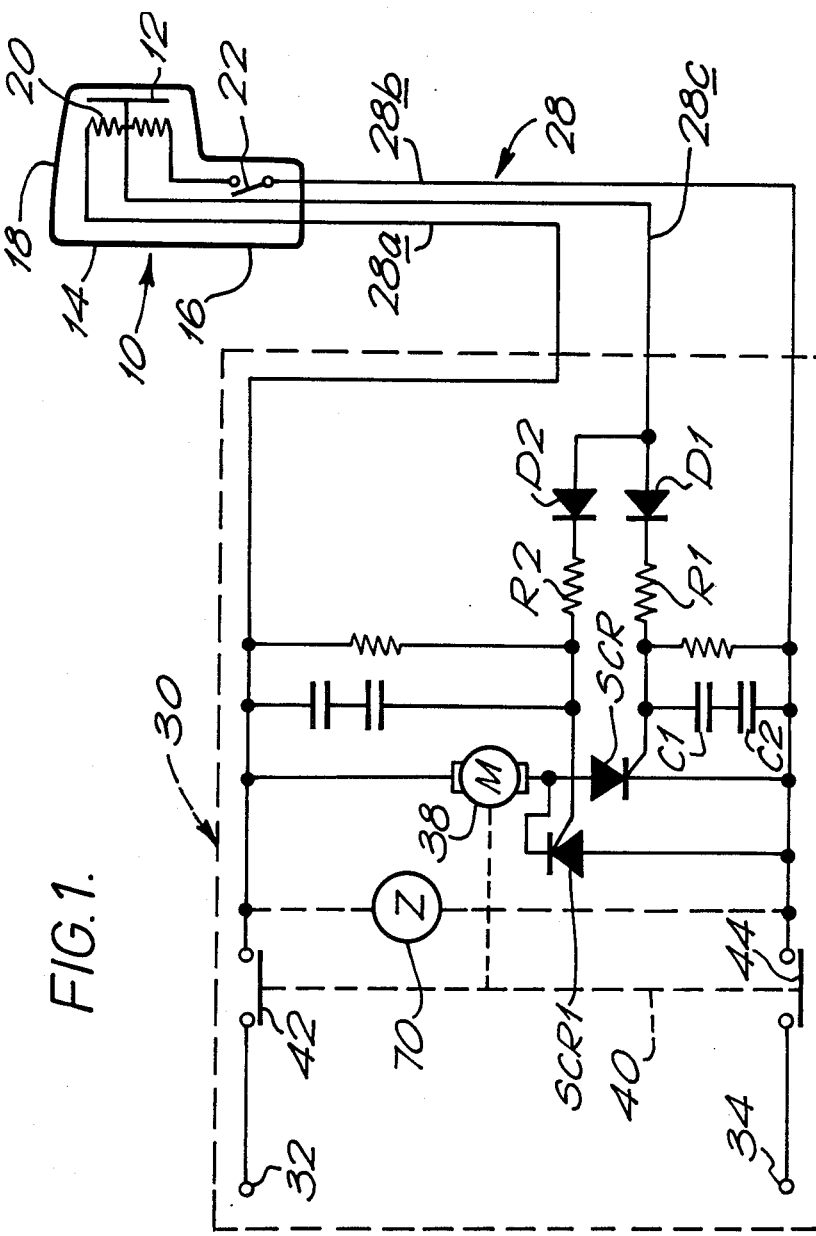
FIG. 1 is a circuit diagram of one embodiment of the invention.

The hair drier 10 shown in FIG. 1 of the drawings can be of conventional construction apart from the presence of a sensor 12 as described below. It comprises a housing 14 having a handle 16 to be grasped and held by the user and a portion 18 containing an electric motor and fan and heating coils 20 not shown in detail because they can be of conventional construction. A manually controlled "on-off" switch 22 is provided on the handle 16.

The hair drier 10 is connected by a three-cored supply lead 28 to a plug 30 having normal blades or pins 32 and 34 for connection to a mains power output socket (not shown). The power supply to the hair drier is through wires 28a and 28b which are normally connected to the pins 32 and 34, respectively.

The sensor 12 is provided within the portion 18 of the hair drier housing. This is in the form of a thin metal mesh, grid or foil in the shape of a cone or sleeve surrounding the motor and heating coils. The shape and position is not essential however, and the sensor can be of any appropriate shape or size to surround or be near whatever parts within the hair drier are likely to be "live" or exposed. As an example, it can be a 0.008 inch (0.2 mm) thick metal sheet which encompasses at least of the conventional mica sheet wrapping of the heating coils. These latter contain exposed electrical parts and should moisture enter the housing 14, this will provide a path of conduction between those parts and the sensor 12 whose potential will therefore alter. To detect this, the plug 30 is connected to the sensor by a third wire 28c. This wire is connected by a current limiting resistor R1 and diode D1 to prevent reverse current to the gate of an SCR device.

In series with the SCR device is an electric motor 38. Normally, the SCR device will be non-conductive but when the potential on its base rises, it will become conductive and so capable of passing a high current because it is connected directly across the voltage of the mains supply, i.e. between the wires 28a and 28b.

The motor in turn controls the operation of a double-pole switch 40 having contacts 42 and 44 in series with the lines from the pins 32 and 34 to the wires 28a and 28b, respectively, in the manner to be described below.

These contacts 42 and 44 in the double-pole switch 40 will normally be in the closed position but should the SCR device become conductive and the motor 38 energised, this will, in a manner to be described, allow the double-pole switch 40 to be moved to its "off" position by pressure from a coil spring 46 and so the contact between the contacts 42 and 44 will be broken. In this way, the hair drier 10 will become insulated from the pins 32 and 34.

Figure 2:
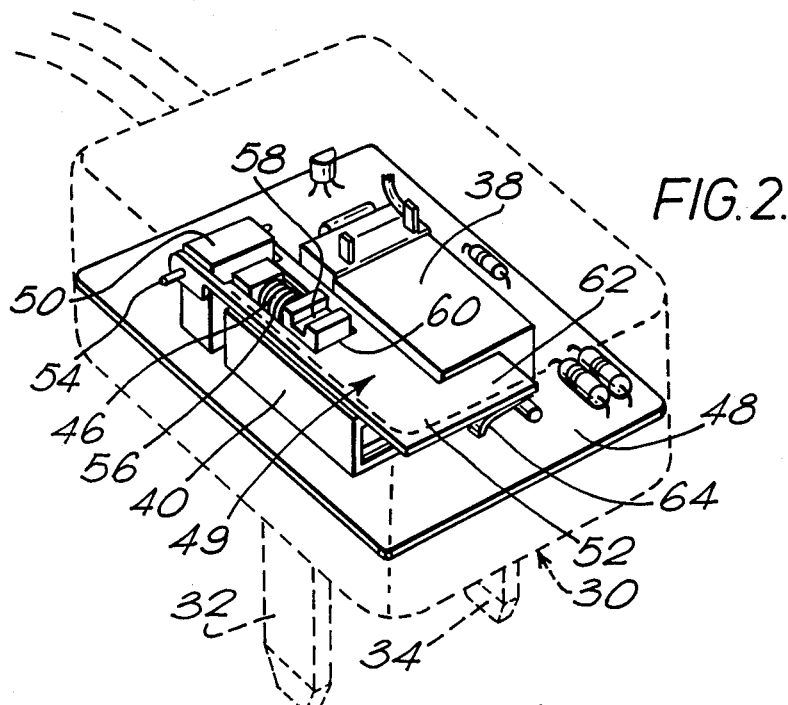
FIG. 2 is an enlarged perspective diagrammatic view of the plug used in the embodiment of FIG. 1.
Figure 3:
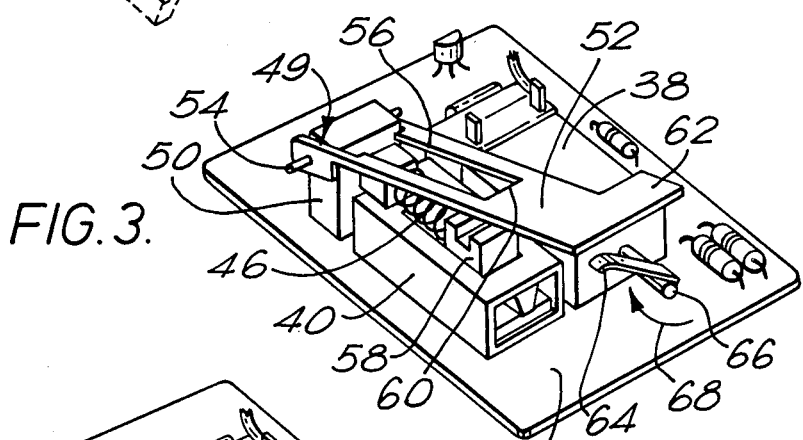
FIG. 3 is a diagram similar to FIG. 2 showing the latch in its open position relative FIG. 2.

One embodiment of the plug 30 is shown in more detail in FIGS. 2 and 3. Mounted on a circuit board 48 is the double-pole switch 40 and the motor 38. Also mounted on the board is a hinged latch 49. This includes a base 50 attached to the board 48 and an arm 52 attached by means of a hinged pin 54 to the upstanding base 50. The arm has elongated opening 56 and in the position shown in FIG. 2, the mechanical slide 58 of the double-pole switch 40 is accommodated within that elongated opening. The mechanical slide 58 is itself urged by means of the spring 46 against the end 60 of the elongated opening, the spring acting between the slide 58 and the base 50. The length of the elongated opening however is chosen such that in the position shown in FIG. 2, and despite the resilient action of the spring 46, the slide 58 is held by its engagement with the end 60 of the slot so that the contact pairs 42 and 44 in the double-pole switch 40 are in the engaged or "on" position.

At its outer end, the arm 52 has a side-ways extension 62. This contacts with a small arm 64 mounted on the output shaft 66 of the motor 38. When the motor is energised, however, the arm rotates in the direction of the arrow 68 (FIG. 3). As, best shown in FIG. 3, the arm 64 engages the extension 62 and causes the arm to hinge in the upward direction to the position shown in FIG. 3. As it does so, the contact between the slide member 58 and the end 60 of the slot is lost, and thereafter the spring 46 can immediately move the slide 58 to the "off" position of the double-pole switch 48 so breaking the contact between the contact pairs 42 and 44.

As will be appreciated, this isolates the hair drier 10 from the mains supply in the event that the sensor 12 detects a path of conduction.

The arrangement is very simple and cheap and uses a minimum of component parts but is still very effective in isolating the hair drier should leakage path be established, e.g. in the event that water enters the hair drier housing 14. Also, it should be noted that when the hair drier is isolated in this way, the various circuit components in the plug are also isolated since they are themselves energised downstream of the double-pole switch 40.

In order to re-establish operation the user needs to open the plug and re-set the arm 52 to the position shown in FIG. 2 or preferably takes the hair drier to a qualified repairer who will check the hair drier at the same time as re-setting the plug. This is however a relatively inexpensive operation and avoids damage to the more expensive hair drier and the danger of electrocution.

As an additional safety feature, a second capacitor C2 may be provided in series with the capacitor C1 so that should the capacitor C1 fail for some reason, the overall circuit will remain operative because of the presence of the capacitor C2 and it is unlikely that both will fail at the same time.

It may also be desirable to include a varistor 70 across the lines 28a and 28b. This will present spike voltages from causing inadvertent operation of the motor 38.

Referring to FIG. 1, it will be seen that a second device SCR1 can be provided in parallel with the SCR device but inverted relative to it. The gate of the SCR1 device is also connected to the sensor 12 through a diode D2 and current limiting resistor R2 which are analogous to the diode D1 and resistor R1. Thus, these extra components are provided so that in the event that the path of conduction from the sensor 12 is to a point which has a voltage close to the neutral wire 28b in which case the SCR device might then not fire, then the SCR1 device will instead fire and actuate the motor 38.

Figure 4:
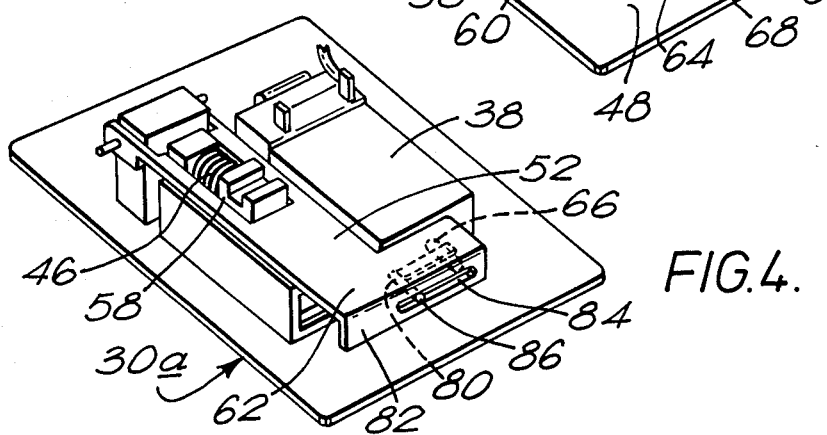
FIG. 4 is a diagram similar to FIG. 2 of a modified embodiment of the invention.

In order to reduce the chance of inadvertent movement of the arm 52 if the plug 30 is accidentally subjected to large vibrations, e.g. if the plug is dropped, then the modified arrangement of plug 30a shown in FIG. 4 may be used. This differs from the plug only in that a crank 80 is attached to the output shaft 66 of the motor 38. Also the extension 62 of the arm 52 has a downwardly extending flange 82 in which is a slot 84 and the outer end 86 of the crank 80 is slidably positioned within that slot 84. In the normal position the crank 80 is positioned so that its arm and end 86 is in the 9 o'clock position relative the shaft 66 as seen from the front in FIG. 4 with the end 86 near the left-hand end of the slot. In this position, the arm 52 holds the slide member 58 so that the switch is in the "on" position. The static torsion of the motor arm resists sudden vibrations such as if the plug is dropped and so prevents accidental upward hinging of the arm 52. However, upon energisation of the motor 38 when the SCR fires because a dangerous condition is detected, the shaft 66 will turn to move the crank to the 12 o'clock position, so pushing the arm 52 upwardly to release the slide member 58, so allowing the spring 46 to move the switch to the "off" position.

A latitude of modification change and substitution is intended in the foregoing d and in some instances some features of the invention be employed without a corresponding use of other Accordingly, it is appropriate that the appended be construed broadly and in a manner consistent spirit and scope of the invention herein.

What I claim:

1. A domestic apparatus that automatically disconnects itself from an external circuit upon existence of a shock hazard in the apparatus, apparatus comprising:
   A. a supply lead having therein,
   B. a plug for electrically c the supply lead to the external circuit, said plug a housing within which are secured:
      1. a normally off DC electric motor having a rotatable output shaft which turns when the motor is energized,
      2. a latch having a normal position
         a. in which the latch remains in the absence of a shock hazard, and
         b. from which the latch is displaceable upon energizing of the motor and rotation of the shaft,
      3. an on-off switch, a portion of which engages the latch when the latter is in its normal position for retaining the switch in its on position, the switch being
         a. in series connection with at least one of the conductors, and
         b. moveable to an off position for disconnecting such conductor from the external circuit,
      4. resilient means with said portion of the switch for biasing the switch toward its off position when the DC motor rotates and causes disengagement of the latch from said portion of the switch, and
      5. control means for energizing and causing rotation of the DC motor on receipt of indications of the existence of a shock hazard in the apparatus, and
   C. electrical working components in the apparatus which are a source of potential shock hazard, and
   D. sensor means in the apparatus adjacent the working components for sensing such shock hazard, and connected with the control means through a conductor in the supply lead for indicating to the control means that such hazard is present.

2. Apparatus according to claim 1 wherein the rotatable DC motor shaft has directly attached to it a trip arm which rotates with said shaft and upon rotational movement of the shaft, displaces the latch from its normal position and releases the switch for opening under the influence of the resilient means.

3. Apparatus according to claim 1 wherein the rotatable DC motor shaft, trip arm and latch are positioned for causing displacement of the latch from its normal position and releasing of the switch for opening under the influence of the resilient means, with no more than about 90 degrees of rotational movement of the shaft.

4. Apparatus according to claim 1 wherein the rotatable DC motor, latch, and switch are mounted on a common circuit board within said plug housing.

5. Apparatus according to claim 1 wherein the rotatable DC motor, latch, switch and control means are mounted on a common circuit board within said plug housing.

6. Apparatus according to claim 1 wherein the rotatable DC motor, latch, and switch are mounted on a common circuit board within said plug housing, and the latch includes a latch arm extending adjacent the switch for engagement with said portion of the switch when the latch is in its normal position.

7. Apparatus according to claim 1 wherein the rotatable DC motor and latch are positioned alongside one another in said plug housing, and said latch includes a latch arm and a sideways extension extending from the latch arm toward the motor shaft.

8. Apparatus according to claim 1 wherein the latch is linked with the motor shaft through a crank on said shaft which engages a slot in the latch.

9. Apparatus according to claim 1 wherein the latch includes an aperture through which said portion of the on-off switch extends when the latch is in its normal position.

10. Apparatus according to claim 1 wherein the latch is a hinged arm and the biasing means is positioned for pushing said portion of the on-off switch against the latch when the latter is in its normal position and for assisting in maintaining the latch in its normal position.

11. Apparatus according to claim 1 wherein the on-off switch is a slide switch.

12. Apparatus according to claim 1 wherein the on-off switch is a double-pole switch for breaking both live and neutral connections between the working components and the external circuit.

13. Apparatus according to claim 1 wherein the on-off switch is a double-pole slide switch for breaking both live and neutral connections between the working components and the external circuit.

14. Apparatus according to claim 1 wherein the biasing means is a coil spring held under compression against the said portion of the on-off switch when the latter is in on position.

15. Apparatus according to claim 1 wherein the control means comprises an SCR device having a gate connected to the sensor and being normally non-conductive but being rendered conductive in response to the indication of shock hazard.

16. Apparatus according to claim 1 wherein the control means comprises an SCR device within the plug housing connected in series with the DC motor, the SCR device having its gate connected to the sensor and being normally non-conductive but being rendered conductive in respond to the indication of shock hazard, whereby a high current passes through the SCR for inducing a magnetic field in the motor, inducing rotation of the motor shaft and releasing the latch.

17. Apparatus according to claim 1 wherein the supply lead includes conductors providing both live and neutral connections between the working components and the external circuit and the control means includes a pair of parallel SCR devices, of which one is rendered conductive when a path of conduction is established with a part of the apparatus whose voltage is at or approaching the value of the live conductor and the other of which is rendered conductive when a path of conduction is established with a part of the apparatus whose voltage is at or near the value of the neutral conductor.

18. Apparatus according to claim 1 wherein the sensor means is positioned within said apparatus adjacent said working components for detecting a path of conduction between said sensor means and components.

19. Apparatus according to claim 1 wherein the sensor means is positioned within said apparatus and the supply lead includes conductors providing both live and neutral connections between the working components and the external circuit, and an additional conductor providing connection between the sensor means and the control means for indicating such hazard.

20. A domestic electrical apparatus that automatically isolates itself from an external circuit comprising live and neutral lines upon existence of a shock hazard in the apparatus, said apparatus comprising:
A. a supply lead having first, second and third conductors therein,
B. a plug for electrically connecting the first and second conductors of the supply lead to the live and neutral lines of the external circuit, said plug having a housing within which are secured on a common circuit board:
  1. normally off DC electric motor having a rotatable output shaft which turns when the motor is energized,
  2. a latch-displacing member extending from said shaft for rotation therewith,
  3. a latch having a normal position
    a. in which the latch remains in the absence of a shock hazard, and
    b. from which the latch is displaceable upon energizing of the motor and rotation of the shaft and latch-displacing member,
  4. an on-off slide switch having first and second poles, a portion of which switch engages the latch when the latter is in its normal position for retaining the switch in its on position, the switch poles being
    a. in series connection with the first and second conductors, and
    b. moveable to an off position for disconnecting such conductors from the live and neutral lines of the external circuit,
  5. switch for biasing the switch towards the switch off position when the DC motor rotates and causes position when the DC motor rotates and causes disengagement of the latch from said portion of the switch, and
  6. control means for energizing and causing rotation of the DC motor on receipt of indication of the existence of a shock hazard in the apparatus, said control means comprising a normally non-conductive SCR device within the plug housing connected in series with the DC motor, and having a gate connected to the third conductor for rendering the SCR device conductive in response to an indication of shock hazard received through the third conductor, for causing a high current to pass through the SCR for inducing a magnetic field in the motor, and for inducing rotation of the motor shaft to release the latch and to cause opening of the switch under the influence of the biasing means,
C. exposed electrical working components in the apparatus which are a source of potential shock hazard, and
D. sensor means in the apparatus adjacent the working components for sensing such shock hazard, and connected with the control means through the third conductor in the supply lead for indicating to the control means that such hazard is present.

21. A hand-held domestic electrical apparatus that automatically isolates itself from an external circuit comprising live and neutral lines upon existence of a shock hazard in the apparatus, said apparatus comprising:
A. a supply lead having first, second and third conductors therein,
B. a non-polarizing plug for electrically connecting the first and second conductors of the supply lead to the live and neutral lines of the external circuit, said plug having a housing within which are secured on a common circuit board:
  1. a normally off DC electric motor having a rotatable output shaft which turns when the motor is energized,
  2. a latch-displacing member extending from said shaft for rotation therewith,
  3. a latch having a hinged latch arm with a normal position
    a. in which the latch remains in the absence of a shock hazard, and
    b. from which the latch is displaceable upon energizing of the motor and rotation of the shaft and latch-displacing member,
    rotatable DC motor and latch arm being positioned alongside one another in said plug housing, and said latch arm including a sideways extension extending from the latch arm toward the motor shaft, the latch being linked with the motor shaft through a crank on said shaft which engages a slot in the latch arm,
  4. an on-off slide switch extending adjacent the latch arm, a portion of which switch engages the latch arm when the latch is in its normal position for retaining the switch in its on position, the switch having first and second poles being a. in series connection with the first and second conductors, and b. moveable to an off position for disconnecting such conductors from the live and neutral lines of the external circuit, 5. spring means connected with said portion of the switch for biasing the switch against the latch when the latch is in normal position and towards the switch off position when the DC motor rotates and causes disengagement of th latch from said portion of the switch, and 6. control means for energizing and causing rotation of the DC motor on receipt of indication of the existence of a shock hazard in the apparatus, said control means comprising a normally nonconductive SCR device within the plug housing connected in series with the DC motor, and having a gate connected to the third conductor for rendering the SCR device conductive in response to an indication of shock hazard received through the third conductor, for causing a high current to pass through the SCR for inducing a magnetic field in the motor, and for inducing rotation of the motor shaft to release the latch and to cause opening of the switch under the influence of the biasing means, C. exposed electrical working components in the apparatus which are a source of potential shock hazard, and D. sensor means in the apparatus adjacent the working components for sensing such shock hazard, and connected with the control means through the third conductor in the supply lead for indicating to the control means that such hazard is present.

* * * * *